(12) United States Patent
Ching et al.

(10) Patent No.: US 9,547,666 B2
(45) Date of Patent: Jan. 17, 2017

(54) LOCATION GRAPH BASED DERIVATION OF ATTRIBUTES

(71) Applicant: NinthDecimal, Inc., San Francisco, CA (US)

(72) Inventors: Kevin Ching, Berkeley, CA (US); Grigory Sokol, Castro Valley, CA (US); Ahmad Fairiz Azizi, Santa Clara, CA (US); Luke Gain, Santa Clara, CA (US); Yury Zhyshko, Minsk (BY); Mark Dixon, Belmont, CA (US); Robert Abusaidi, Angels Camp, CA (US); Kevin McKenzie, Moraga, CA (US); John Raymond Klein, El Dorado Hills, CA (US); Leonid Blyukher, Burlingame, CA (US); Jeff Pittelkau, Oakland, CA (US); David Staas, Menlo Park, CA (US)

(73) Assignee: NinthDecimal, Inc., San Francisco, CA (US)

( * ) Notice: Subject to any disclaimer, the term of this patent is extended or adjusted under 35 U.S.C. 154(b) by 0 days.

(21) Appl. No.: 14/529,682

(22) Filed: Oct. 31, 2014

(65) Prior Publication Data
US 2015/0052132 A1 Feb. 19, 2015

Related U.S. Application Data

(63) Continuation of application No. 13/924,103, filed on Jun. 21, 2013.

(60) Provisional application No. 61/663,183, filed on Jun. 22, 2012.

(51) Int. Cl.
*G06F 17/30* (2006.01)

(52) U.S. Cl.
CPC ..... *G06F 17/30241* (2013.01); *G06F 17/3087* (2013.01)

(58) Field of Classification Search
CPC ................. G06F 17/3087; G06F 17/30241
See application file for complete search history.

(56) References Cited

U.S. PATENT DOCUMENTS

| | | | |
|---|---|---|---|
| 7,818,176 B2 * | 10/2010 | Freeman et al. | 704/270 |
| 7,848,765 B2 | 12/2010 | Phillips et al. | |
| 8,019,692 B2 * | 9/2011 | Rosen | 705/319 |
| 8,428,867 B2 | 4/2013 | Ashley, Jr. et al. | |
| 8,489,596 B1 | 7/2013 | Milton et al. | |
| 8,725,168 B2 | 5/2014 | Garcia et al. | |
| 8,768,876 B2 | 7/2014 | Shim et al. | |
| 8,792,909 B1 | 7/2014 | Xu et al. | |
| 2002/0087522 A1 | 7/2002 | MacGregor et al. | |
| 2007/0146200 A1 | 6/2007 | Norin et al. | |
| 2007/0179792 A1 * | 8/2007 | Kramer | 705/1 |
| 2008/0262929 A1 | 10/2008 | Behr | |

(Continued)

OTHER PUBLICATIONS

International Patent Application PCT/US2013/047089, International Search Report and Written Opinion, Jan. 10, 2014.

*Primary Examiner* — Leslie Wong
(74) *Attorney, Agent, or Firm* — Greenberg Traurig LLP (57) ABSTRACT

Location graph-based derivation of user attributes is disclosed. In various embodiments, location data associated with a user, such as a current and/or past location at which the user has been, is received. A user attribute data associated with the location data is determined and used to update a user profile associated with the user.

20 Claims, 11 Drawing Sheets

(56) References Cited

U.S. PATENT DOCUMENTS

| | | |
|---|---|---|
| 2010/0004997 A1 | 1/2010 | Mehta et al. |
| 2010/0211636 A1 | 8/2010 | Starkenburg et al. |
| 2011/0004561 A1 | 1/2011 | Shahine et al. |
| 2011/0040870 A1* | 2/2011 | Wynn et al. .................. 709/224 |
| 2011/0282964 A1 | 11/2011 | Krishnaswamy et al. |
| 2012/0071175 A1 | 3/2012 | Skibiski et al. |
| 2012/0136724 A1 | 5/2012 | McGuire et al. |
| 2013/0117109 A1 | 5/2013 | Busch |
| 2013/0137464 A1* | 5/2013 | Kramer et al. ............ 455/456.3 |
| 2013/0318077 A1* | 11/2013 | Greenzeiger et al. ........ 707/724 |
| 2014/0012806 A1 | 1/2014 | Ching et al. |
| 2014/0195530 A1 | 7/2014 | Milton et al. |
| 2014/0222704 A1* | 8/2014 | Abhyanker ................... 705/319 |
| 2014/0230030 A1* | 8/2014 | Abhyanker ....................... 726/6 |
| 2014/0236669 A1 | 8/2014 | Milton et al. |
| 2014/0304038 A1 | 10/2014 | Milton et al. |
| 2015/0019294 A1 | 1/2015 | Milton et al. |
| 2015/0026181 A1 | 1/2015 | Milton et al. |
| 2015/0149091 A1 | 5/2015 | Milton et al. |
| 2015/0199699 A1 | 7/2015 | Milton et al. |
| 2016/0027055 A1 | 1/2016 | Dixon et al. |

\* cited by examiner

LOCATION GRAPH BASED DERIVATION OF ATTRIBUTES

RELATED APPLICATIONS

The present application is a continuation application of U.S. application Ser. No. 13/924,103 entitled "Location Graph based Derivation of Attributes", filed Jun. 21, 2013, which claims priority to Prov. U.S. Pat. App. Ser. No. 61/663,183 entitled "Location Graph based Derivation of Attributes", filed Jun. 22, 2012, the entire disclosures of which applications are hereby incorporated herein by reference.

BACKGROUND

Computer "cookies" have been used to track which websites a computer user has visited, e.g., using a browser. Browsing history information gathered using cookies has been used to select for display to the computer user, e.g., in a banner or pop-up ad, advertising content that may have been selected based at least in part on attributes of pages the user has visited. For example, a computer user who has visited web pages associated with automobiles may be more likely to have a car ad selected for display to the user.

Attempts have been made to target ads to a mobile device user based on the user's current geographic location. For example, an ad "request" sent by and/or on behalf of a mobile app being used by a mobile user may include GPS or other current location information (e.g., latitude/longitude), and an attempt may be made to serve to the mobile user for display in the context of the mobile app an ad that has been selected based on the current location information included in the ad request, for example an ad for a business that is located at or near the user's current location.

Ads also have been selected based on the content of a site the user is currently visiting or an app the user is using, and based on analyses of social media content associate with a user, such as the user's own feed or that of the user's friends, etc.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Building a profile of a user based on the user's location history is disclosed. In various embodiments, demographic and/or behavioral profiles associated with a user's current and/or past location(s) are attributed to the user. For example, in some embodiments a location data, such as a latitude/longitude or other location identifying information, may be received, e.g., in an ad request from an anonymous or a previously known user. When the ad request comes in, the location is mapped to a business or other place of interest, a zip+4 code, etc. One or more user attributes associated with the business or other named place to which the user's location has been mapped may be added to a user profile associated with the user.

In various embodiments, the user attributes may be associated with the user's location at varying degrees of granularity and/or specificity. For example, the user's profile may be updated based on including information about where the user was in a business or other defined location, say in the International Terminal of an airport as opposed to more generally being at the airport. Such more specific information may signal that the user is not only a traveler but also an international traveler. For another example, the user may be determined to be located in the women's clothing department in a clothes retailer, which may signify that the user is a woman, or say in the appliance section versus the TV section in a big box electronics store to signal someone interested in an appliance rather than a TV.

If the user previously was unknown, a new profile may be created and stored for the user. If the same user is seen again, e.g., a future ad request from the same mobile or other equipment is received, the user's profile may be updated, for example by adding further attributes about the user to the profile, increasing a confidence level associated with one or more attributes added to the profile previously, etc.

In various embodiments, a "location taxonomy" that assigns demographic and behavior profiles to businesses and places of interests is created and maintained. For example, users in nail salons may be determined based on demographic attributes of past users at that location to be statistically likely to be females, users in plumbing stores may be determined based on demographic attributes of past users at that location to be statistically likely to be males, and users on child playgrounds may be determined based on demographic attributes of past users at that location to be statistically likely to have kids. In various embodiments, attributes ascribed to a user based on attributes associated with places they have visited may be confirmed to be correct or incorrect in a particular case based on other information, for example attributes associated with other locations the same user has visited, user profile information received from and/or confirmed by the user, information from third party data sources about the user, the user's equipment, and/or places the user has been, etc. In some embodiments, rules may be used to classify a zip+4 code as either "home zip" or "work zip," e.g., based on time of day, proximity to other users, etc. In some embodiments, third party data associating demographic and/or other data with locations at the zip+4 level may be used.

Figure 1:
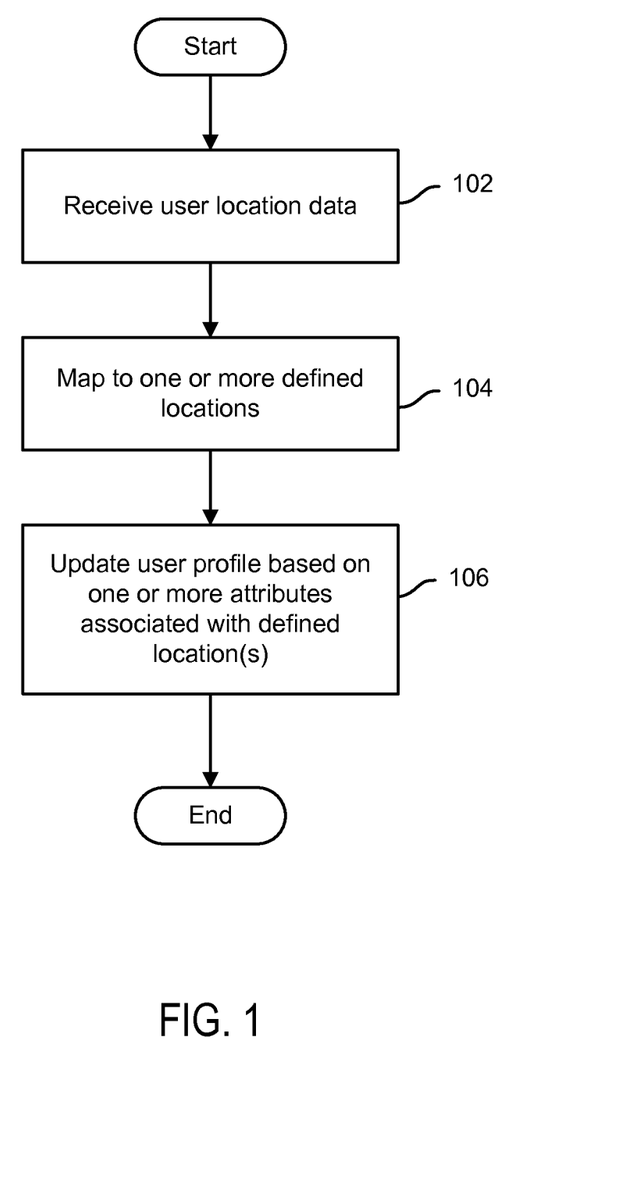
FIG. 1 is a flow chart illustrating an embodiment of a process to build a user profile based on information associated with locations with which the user has been associated.

FIG. 1 is a flow chart illustrating an embodiment of a process to build a user profile based on information associated with locations with which the user has been associated. In the example shown, user location data is received (102). Examples include, without limitation, receiving an ad request associated with a mobile app user, which includes GPS (e.g., latitude/longitude) and/or other current location data associated with the user. The received location data is mapped to one or more defined locations (104). For example, a received latitude/longitude may be mapped to a business or other place of interest; a zip+4 or other postal code; a city, neighborhood, or district; etc. A user profile associated with the user and/or the user's equipment (e.g., mobile device) is updated based on one or more attributes associated with the defined location(s) to which the received location has been mapped (106). For example, in some embodiments, when an ad request comes in, backend algorithms and business rules are applied to assign a set of demographic and behavioral attributes to the user. A lookup of the user is performed to see if any prior history on the user has been stored. In some embodiments, an identifier of the mobile device with which an ad request is associated is mapped to a unique identifier associated with a user with which the equipment from which the ad request was received is associated. If no profile exists that is associated with the equipment, a unique identifier is generated and assigned to the previously-unknown user with whom the equipment is presumed to be associated, and the equipment identifier (e.g., mobile identifier) is associated with the user via the profile.

In various embodiments, a user profile may contain user demographic and behavioral attributes derived, for example, from the user's past locations, and may enable a more informed decision to be made as to which ad or other content may be of interest to the user, even if the ad request received from the user's device does not contain location information and/or no useful information is derived from the current location. For example, the user profile lookup may reveal the user is an "auto intender" (i.e., someone currently intending to buy an auto), even though the user is not currently anywhere near an auto dealership.

In some embodiments, a weighted algorithm is used to adjust a current profile on the user based on user information associated with a current location of the user. In various embodiments, over time increasingly accurate profile attributes may be determined, based on information amalgamated about where a user has been.

Figure 2:
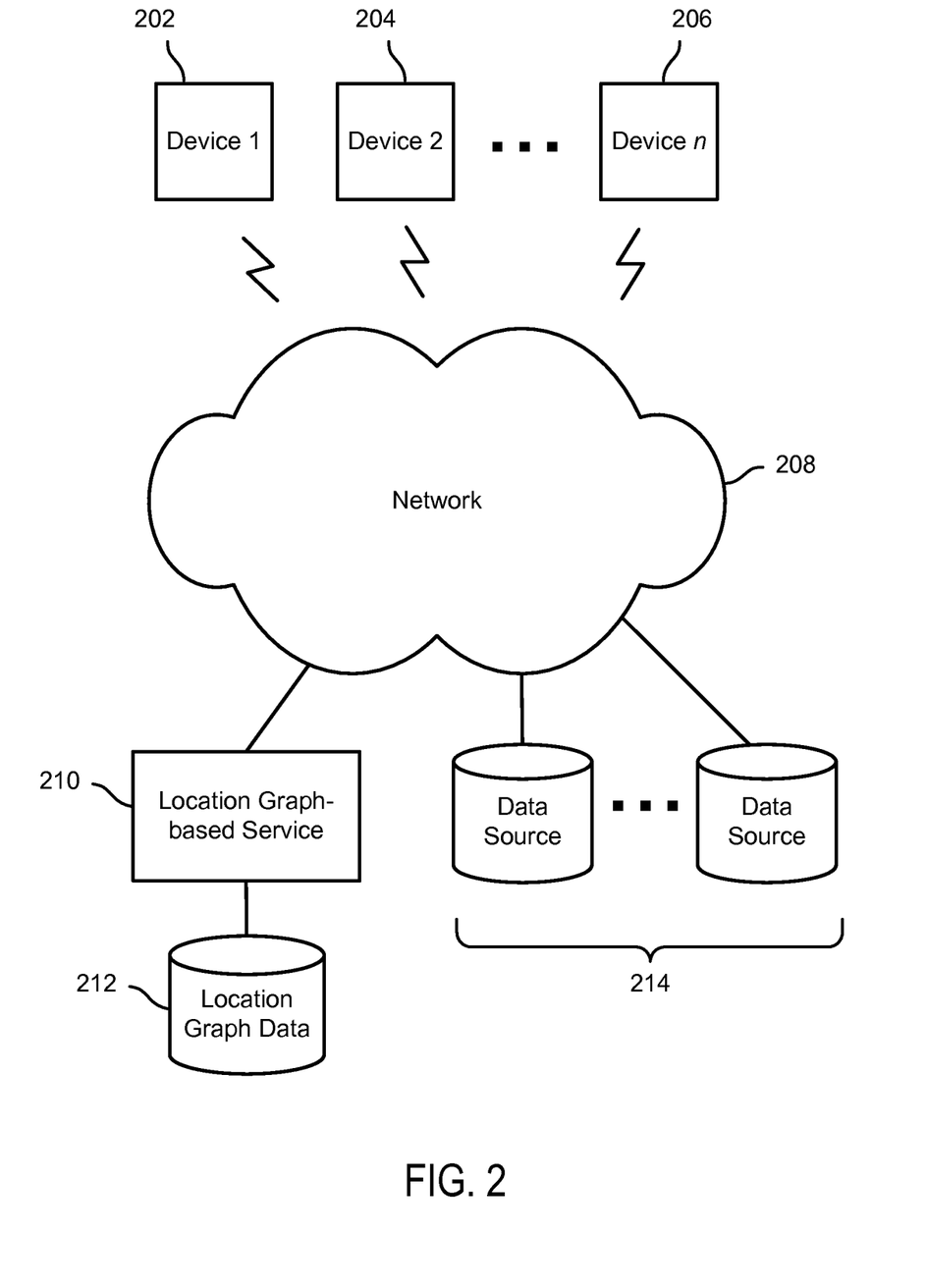
FIG. 2 is a block diagram illustrating an embodiment of a system to build a user profile based on location information.

FIG. 2 is a block diagram illustrating an embodiment of a system to build a user profile based on location information. In the example shown, users use mobile and/or other devices, represented in FIG. 2 by devices 202, 204, and 206, to communicate via one or more networks, represented in FIG. 2 by network 208, e.g., a mobile telecommunications network and/or the Internet. A location graph-based service residing on one or more servers 210 receives location information associated with the respective users of devices such as devices 202, 204, and 206. For example, as described above GPS and/or other location information (wifi hotspot id, etc.) may be received in connection with ad requests, e.g., from a mobile app being used by a user and/or a page visited using a browser software on a mobile device. The location graph-based service 210 uses information associated with the current and/or past locations at which the user has been located to determine attributes to be associated with the user, for example by storing such attributes in a user profile for the user. In the example shown, one or more of user profiles; data associating geographic location coordinates, such as latitude and longitude, with a business or other place of interest, or another defined location; and data associating one or more user attributes (e.g., demographic, behavioral, etc.) with respective defined locations are stored in a location graph data store 212. In various embodiments, data from third party and/or other external data sources 214 may be used to build and/or update a user's profile based at least in part on the location(s) at which the user has been. For example, third party data sources 214 may be used to map location coordinates to a zip+4 or other postal code, and/or to determine for a given postal code one or more attributes to be associated with a user, such as whether the location is a home or work location, and/or demographic data such as median income, etc.

Figure 3:
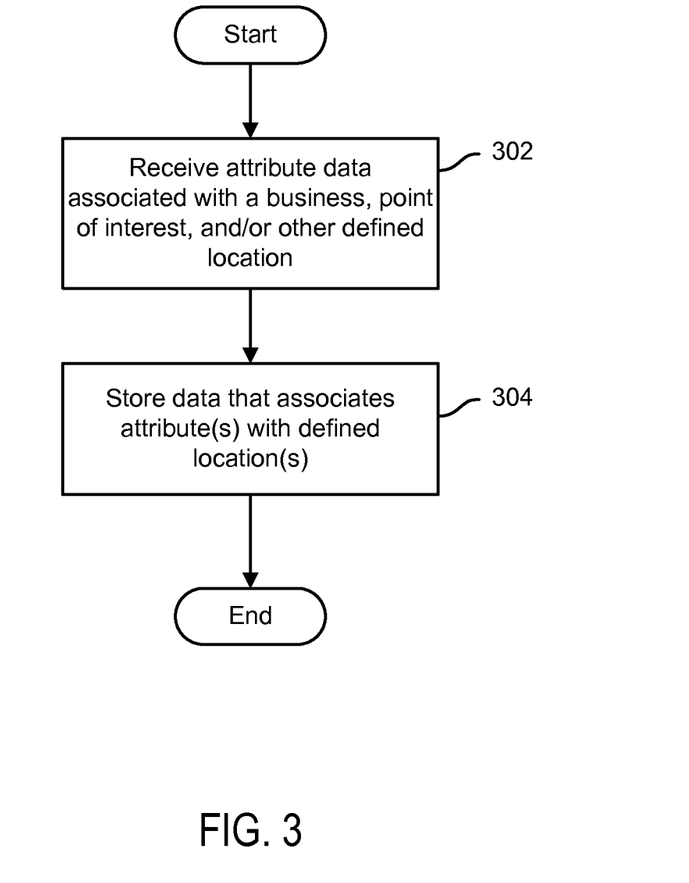
FIG. 3 is a flow chart illustrating an embodiment of a process to associate user attributes with defined locations.

FIG. 3 is a flow chart illustrating an embodiment of a process to associate user attributes with defined locations. In the example shown, user attribute data associated with a business, point of interest, and/or other defined location is received (302). Data that associates the user attributes with the defined location is stored (304). For example, if a human operator and/or data from a third party data source indicates a particular business is very much more likely to be patronized by a woman than a man, data associating the gender attribute "female" with the business may be stored. In the case of an activity center for senior citizens, an age attribute of "senior" and/or an employment status attribute of "retired" may be associated with the location. In still another example, an auto dealership may have associated therewith a user attribute reflecting a consumption intention the user may be assumed to be likely to have, such as "auto intender".

In various embodiments, user attributes may be assigned to places of business based on business floor plans or calendar events. An example of assigning user attributes based on floor plan is if a user is in a big box electronic retailer and by accessing information about the business floor plan, the system is able to determine if the user was in the appliance or TV section as a more specific signal of intent (i.e., to purchase an appliance versus a TV); whether the user was at a sales register as an indication that the user may have responded favorable to an ad sent to the user; or whether the user was at a sales register in the appliance or TV section as a stronger indication that the user actually made a purchase of the type of item advertised. An example of assigning user attributes based on calendar events is a multi-use venue such as an airport or stadium. Stadiums host both sporting events and music events, and in some embodiment a calendar of events is used at least in part to ascribe attributes to users based on the nature of event that is scheduled to be occurring at the time the user is observed to be at the venue In various embodiments, user attributes may be associated with a defined location with varying degrees of confidence, reflected for example in a confidence or other score and/or weighting associated with the user attribute with respect to that defined location. For example, if 90% of nail salon patrons are known to be female, a gender attribute of "female" may be assigned (at least initially) with a 90% degree of confidence to a user profile of a user observed to be or have been in a nail salon. Other gender attribute information may be or have been derived from other sources, such as based on other locations the same user has visited, and for each such location a corresponding confidence score and/or weighting may be associated with the gender attribute associated with that location. The respective confidence scores, weightings, etc. may be used in various embodiments to determine a most likely value for the attribute and an associated level of confidence, which in various embodiments are stored in the user's profile.

Figure 4:
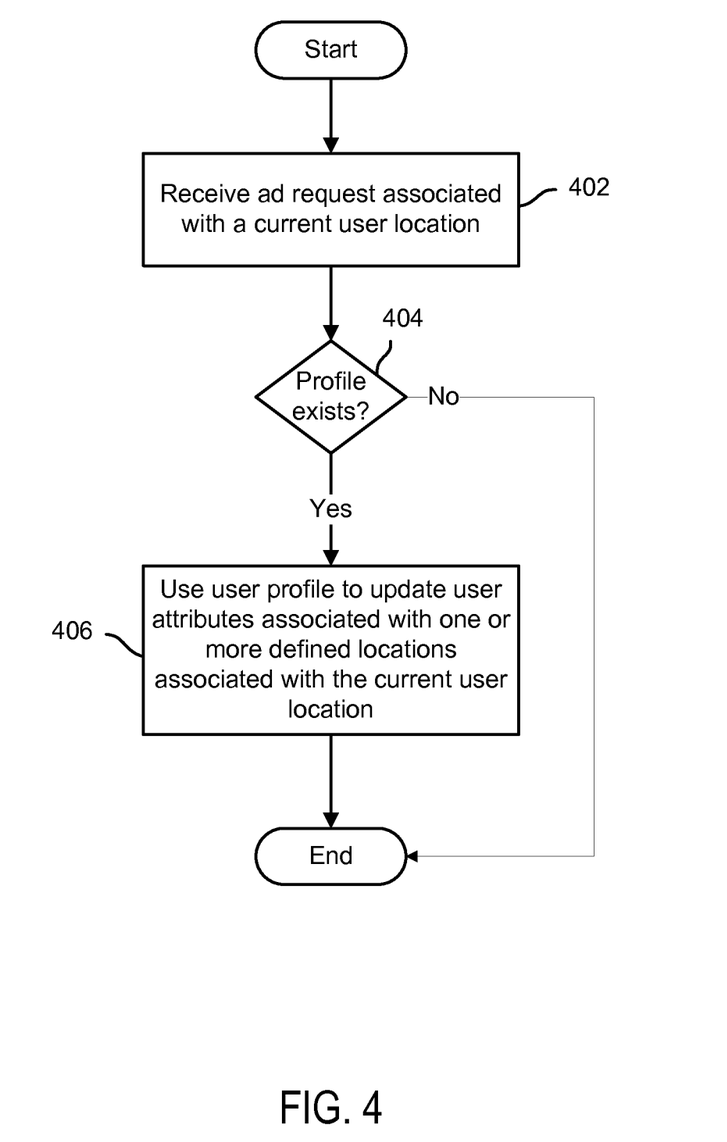
FIG. 4 is a flow chart illustrating an embodiment of a process to associate user attributes with defined locations.

FIG. 4 is a flow chart illustrating an embodiment of a process to associate user attributes with defined locations. In the example shown, an ad request associated with a current user location is received (402). If the user has a user profile (404), one or more user attributes of the user, read from the user's profile, may be used to update user attribute data associated with the location (406). For example, if the location is a business, user attributes associated with the user based on the user's past locations and/or other sources may be used to update one or more user attributes associated with the business, and/or to update a confidence score or weighting associated with one or more user attributes. In this way, user attributes of users who visit a defined location may be used, over time, to develop a defined location profile for the defined location and to store therein user attributes observed to be associated with user's who have visited the defined location.

Figure 5:
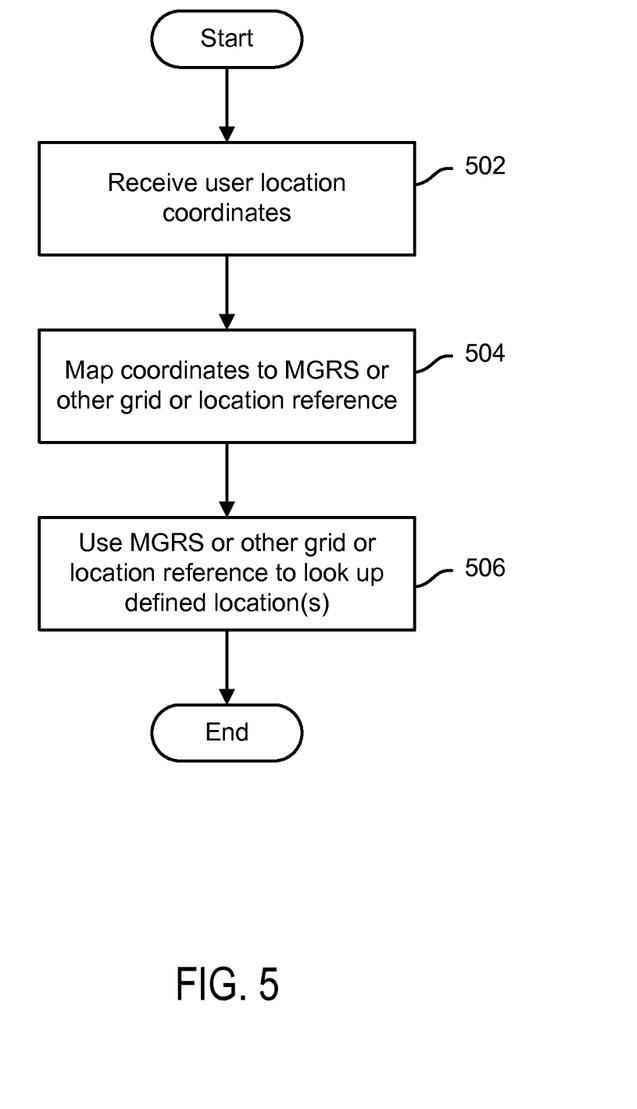
FIG. 5 is a flow chart illustrating an embodiment of a process to map current location coordinates to a defined location.

FIG. 5 is a flow chart illustrating an embodiment of a process to map current location coordinates to a defined location. In the example shown, user location coordinates, such as latitude and longitude, are received (502). The location coordinates are mapped to a standard and/or proprietary geo-coordinate reference, such as the military grid reference system (MGRS) (504). The MGRS or other grid location to which a set of coordinates has been mapped is used to look up one or more defined locations associated with the determined grid (506). In various embodiments, third party and/or proprietary databases may be used to determine one or more businesses and/or other points of interests that are associated with a given MGRS or other grid or otherwise referenced location.

Figure 6:
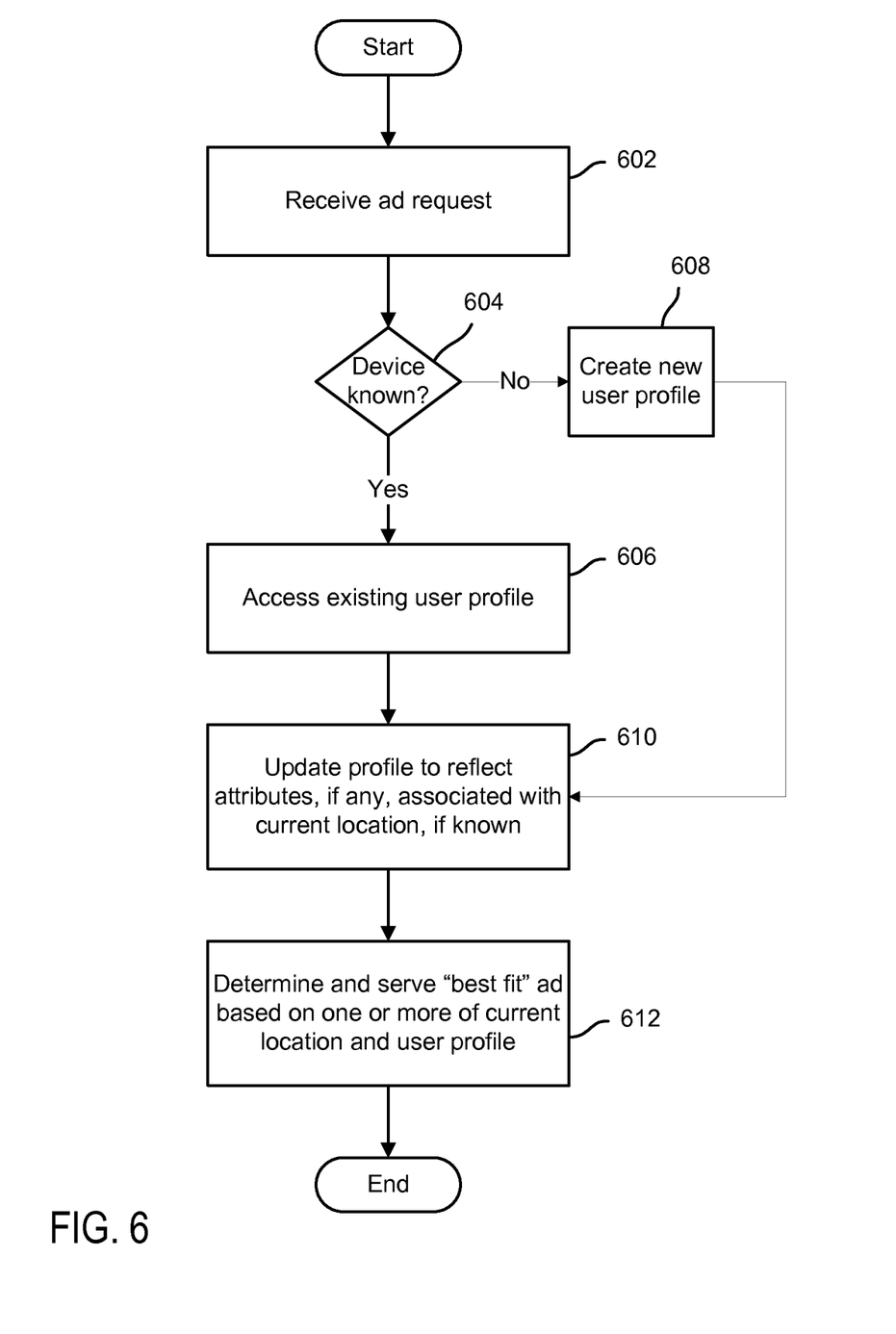
FIG. 6 is a flow chart illustrating an embodiment of a process to provide content based on current and/or past location.

FIG. 6 is a flow chart illustrating an embodiment of a process to provide content based on current and/or past location. In the example shown, an ad request that includes location information is received (602). If the device is known (604), an existing user profile is accessed (606); otherwise, a new user profile is created and the device is associated with the newly-created profile (608). The user profile is updated to reflect attributes, if any, associated with the user's current location (610). For example, as noted above, one or more user attributes associated with a defined location to which the user's current and/or past location(s) has/have been mapped may be used to update the user's profile. The update profile and/or the user's current location is/are used, in this example, to determine and serve an ad to the user (612). For example, if the user has visited one or more auto dealerships that day and is currently at a location that has been determined to be the user's home, the user may be served an automobile ad, as a result of having been identified in the user's profile as being an "auto intender" (i.e., a person who currently is at least considering buying an automobile), based on the user's past locations, specifically the automobile dealership(s) the user visited earlier in the day.

In the example shown in FIG. 6, a user's profile and/or current location are used to select and serve an advertisement. In various embodiments, content other than an advertisement may be selected to be provided to the user based on the user's profile and/or attributes associated with and/or derived from the user's current and/or prior locations, including without limitation an article or other non-advertising content; game related content, such as an invitation to download and play a game or an interaction with a game the user has played; an invitation to participate in online social activity, such as by joining a group that has been determined to be of potential interest to the user; an invitation to download an app developed by a retailer, based on the user's affinity towards the retailer or other stores similar to the retailer; a notification of an upcoming event either sponsored or for sale by a retailer based on the user's demographic and behavioral profile, e.g., pre-release concert tickets for music fans or preview only sales for loyal shoppers; etc.

Figure 7A:
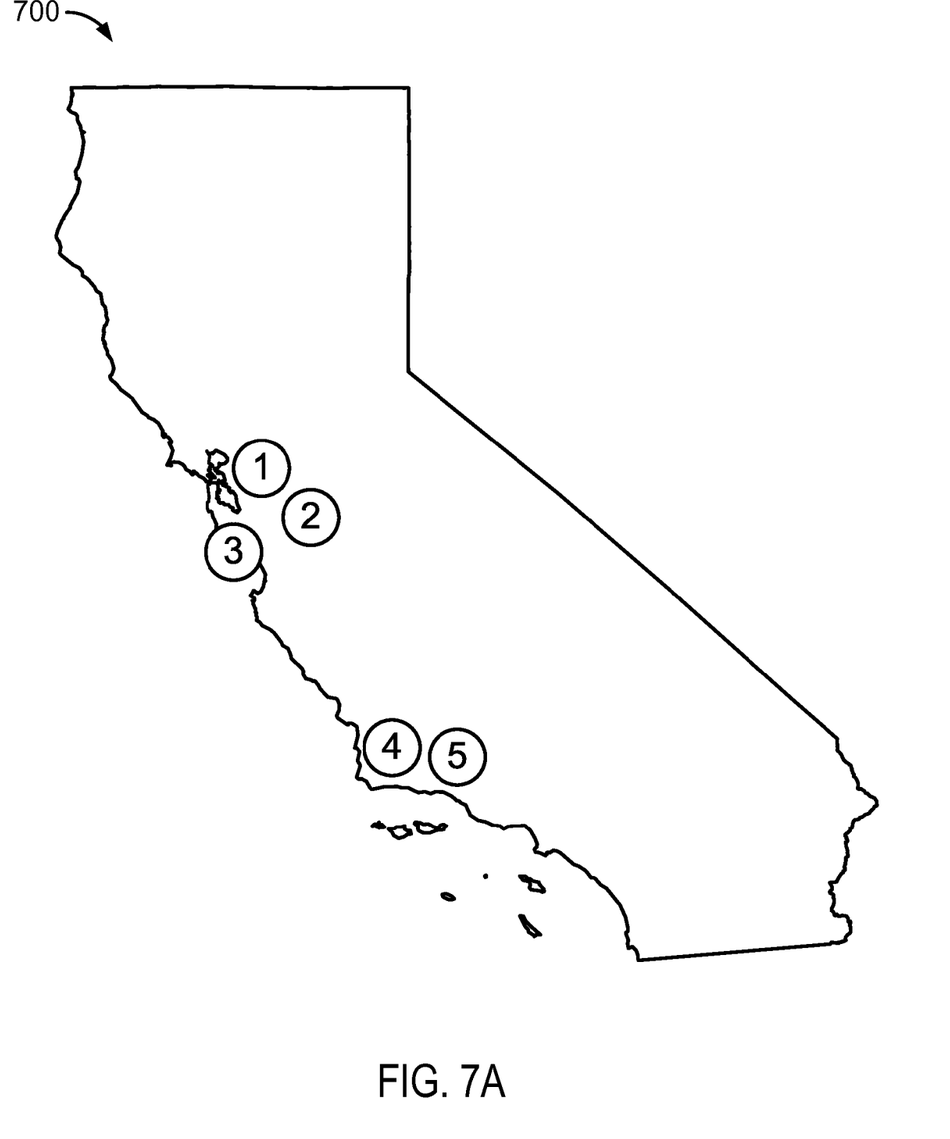
FIG. 7A is a block diagram illustrating an embodiment of a location graph.

FIG. 7A is a block diagram illustrating an embodiment of a location graph. In the example shown, the location graph 700 indicates five numbered locations at which a user has been observed, in this case three locations in the San Francisco Bay Area and two locations in southern California. Depending on the respective times at which the user was at the locations shown in FIG. 7A and the specific nature of and user attributes associated with the respective defined location(s) to which the user's locations were mapped, one or more user attributes of the user may have been derived from the user's presence at the locations shown, and such attributes used to update a user profile of the user. For example, if the locations labeled "3" and "5" were associated with corporate offices of the same company, the user may be determined, possibly tentatively (i.e., with relatively lower confidence) in the first instance, to be associated with that company, e.g., as an employee of and/or service provider to that company. Over time, the degree of confidence may be increased, for example if the user is observed regularly to be at the location "3" during normal working hours Monday-Friday, the user may with higher confidence be determined to be an employee of the company whose primary workplace is in the San Francisco area office. Likewise, if frequent trips outside the user's home area are observed to be made to business-related locations in other cities, the user's profile may be updated to reflect that the user is a (frequent, occasional, etc.) business traveler.

In various embodiments, user attributes may be determined based on one or more prior locations, and those attributes may be used to select an ad to be served in response to ad requests that do not include a location. For example, in some embodiments if enough prior location history is known about a user to assign to the user an "auto intender" profile as described above, the prior location-derived "auto intender" profile may be assigned to the user and used to serve an auto ad even if the current ad request does not have a location.

Figure 7B:
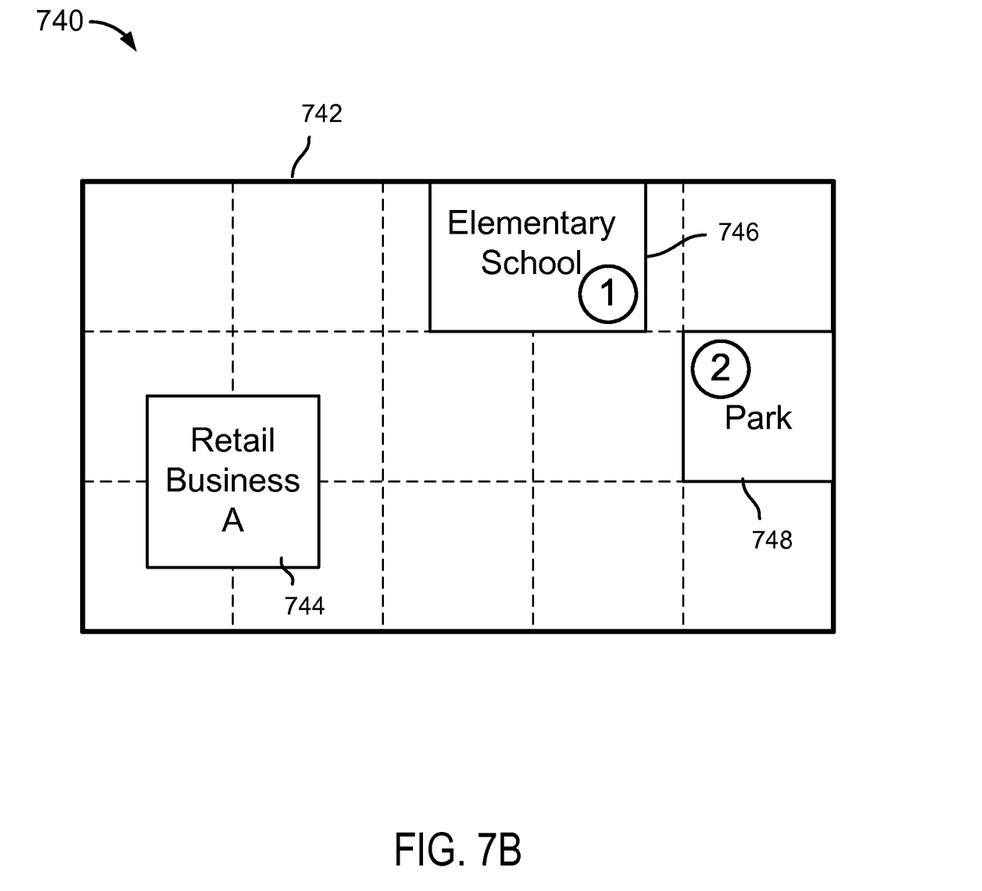
FIG. 7B is a block diagram illustrating an embodiment of a location graph.

FIG. 7B is a block diagram illustrating an embodiment of a location graph. In the example shown, the location graph 742 shows certain defined locations, in this example a retail business 744, an elementary school 746, and a park 748, each shown in its corresponding location within a grid indicated by dashed lines. In the example shown, depending on the respective times of day, days of the week, pattern in relation to other locations visited, etc., a user who visited the locations "1" and "2" as shown may be determined to be a parent of one or more elementary school age children, for example. User attributes derived from the user's visits to the elementary school and park, in this example, may be used in various embodiments to determine ads to be served to the user. For example, later in the day, when the user is at a home location not shown in FIG. 7B, the user may be served an ad targeted to users who have elementary school aged children. Or, to give another example, the user may be more likely to be served at another location not shown in FIG. 7B an advertisement associated with the retail business 744, based for example on one or more of the user's presence in the past at the illustrated locations relatively near the retail store 744 and one or more user attributes derived from the user's presence in the past at those and/or other locations. For example, if the user in the past has visited an auto dealership associated with an automaker B, the user may be served an ad associated with retail business 744 if, for example, it were a dealership for a competing automobile dealership for the same automaker or a competitive automaker A, based both on a user profile attribute (e.g., "auto intender") ascribed to the user based on the user's past locations and on the fact that the user has in the past (and possibly regularly) been observed to visit locations in the area in which the retail business 744 is located.

Figure 8:
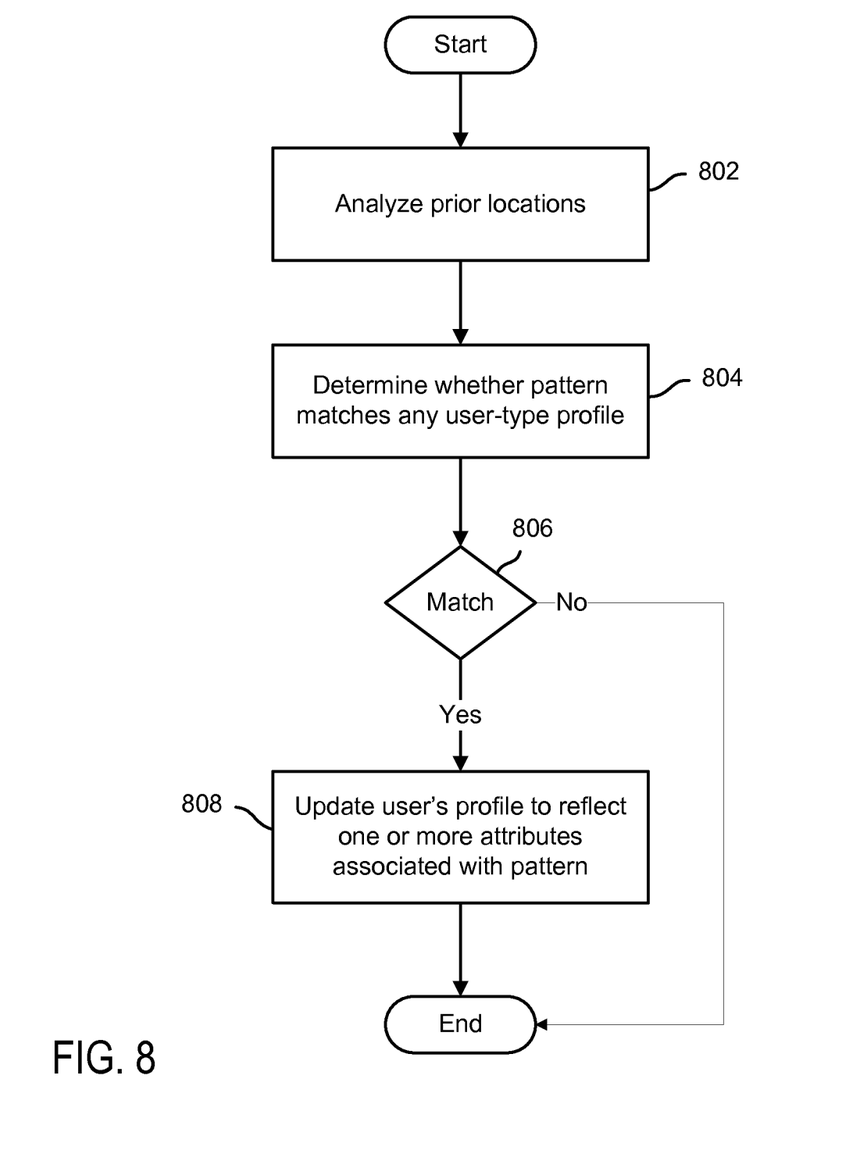
FIG. 8 is a flow chart illustrating an embodiment of a process to derive user profile information from past locations.

FIG. 8 is a flow chart illustrating an embodiment of a process to derive user profile information from past locations. In the example shown, a user's prior locations are analyzed (802) to determine whether the user's location history matches any pattern(s) that may have associated therewith one or more user attributes (804). If the user's location history is determined to match a pattern that has one or more user attributes associated therewith (806), the user's profile may be updated to reflect one or more attributes associated with the matched pattern (808). For example, a user who has been observed to travel regularly on weekday mornings from a home to a nearby school to a grocery store then back to the home and in the afternoon from home to the same school then (sometimes) to a nearby park and then back home may be determined based on those location patterns to be a parent with primary childcare responsibility for a school-aged child. Another user associated with the same home location but who has been observed to travel regularly on weekdays to the same place of business and to remain at that location through most of the work day may be determined to be a member of the same household who is employed outside the home by an employer with which the place of business is associated.

Figure 9:
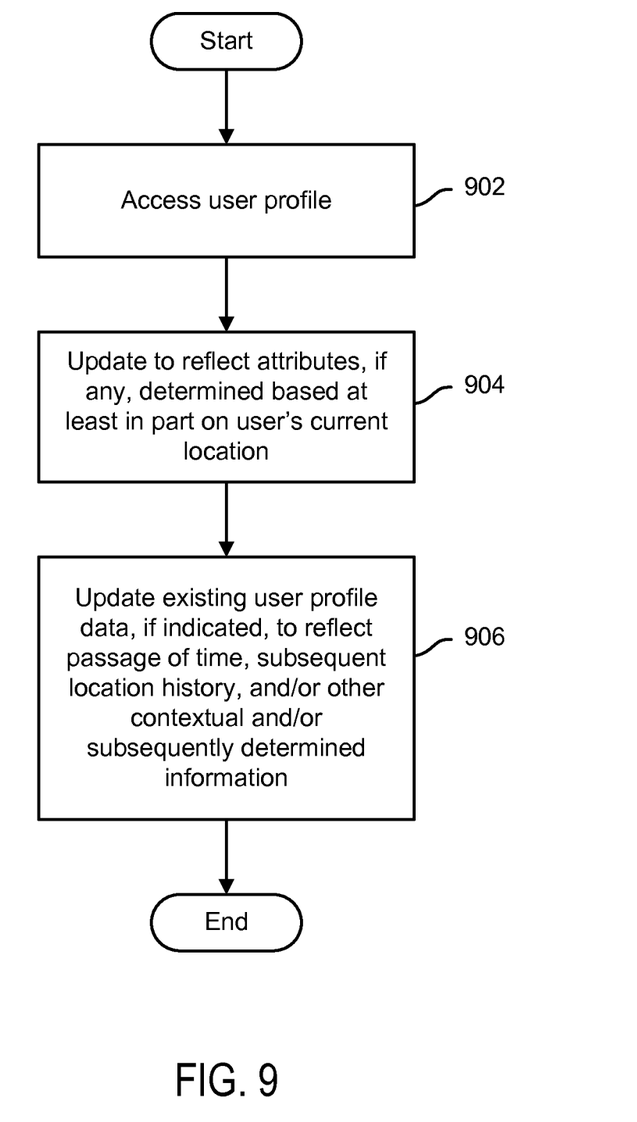
FIG. 9 is a flow chart illustrating an embodiment of a process to update a user profile.

FIG. 9 is a flow chart illustrating an embodiment of a process to update a user profile. In the example shown, the user profile is accessed (902). For example, a mobile device identifier associated with a mobile device with respect to which an ad request has been received may be mapped to a unique user identifier, such as a proprietary or other anonymous identifier that is not the same as or based on the device identifier, and an associated user profile accessed. The user profile is updated to reflect user attributes, if any, determined based at least in part on the user's current location (904). For example, a new attribute may be stored, a previously stored attribute may be updated with a new value, and/or a confidence or other score associated with an attribute has stored in the profile may be updated, for example by increasing the confidence level if the user's presence at the current location tends to confirm the correctness of the previously-assigned value, or by decreasing the confidence level if the user's presence at the current location indicates one or more other values may instead be correct. The user's profile data is updated to reflect information other than attributes associated with the user's current location (906), for example to age at least more ephemeral attributes to reflect the passage of time. For example, a user attribute that identifies the user as a female is relatively unlikely to be changed, whereas a designation of a user as an "auto intender" may be removed from a profile after the passage of a sufficient amount of time during which the user is not observed to visit any locations associated with the "auto intender" attribute.

In various embodiments, a mobile advertisement may be served to a user based on third party data that other companies have gathered about the user, including without limitation offline transaction data. In some embodiments, one or more third parties obtain data from retailers about what consumers spend in their stores. Such data typically is referred to as "offline transaction data," since it happens in a store (and is therefore not "online") and is transactional because it measures actual purchases. Most third party companies know the user's postal address. In various embodiments, third party data records identified by postal address may be used to map such offline transaction data to user profiles built as described herein. A user's location graph, derived from the user's locations as observed via ad requests and/or otherwise, may be used as described herein to determine and store in the user's profile the user's postal address. The postal address determined for the user and stored in the user's profile is then used to "match" data with the third party offline transaction data, enabling both advertisements and measurement studies to be offered to advertisers based on offline transactional data. A measurement study refers in various embodiments to the ability to see how a particular household indexes for a product before and after being exposed to an ad.

Figure 10:
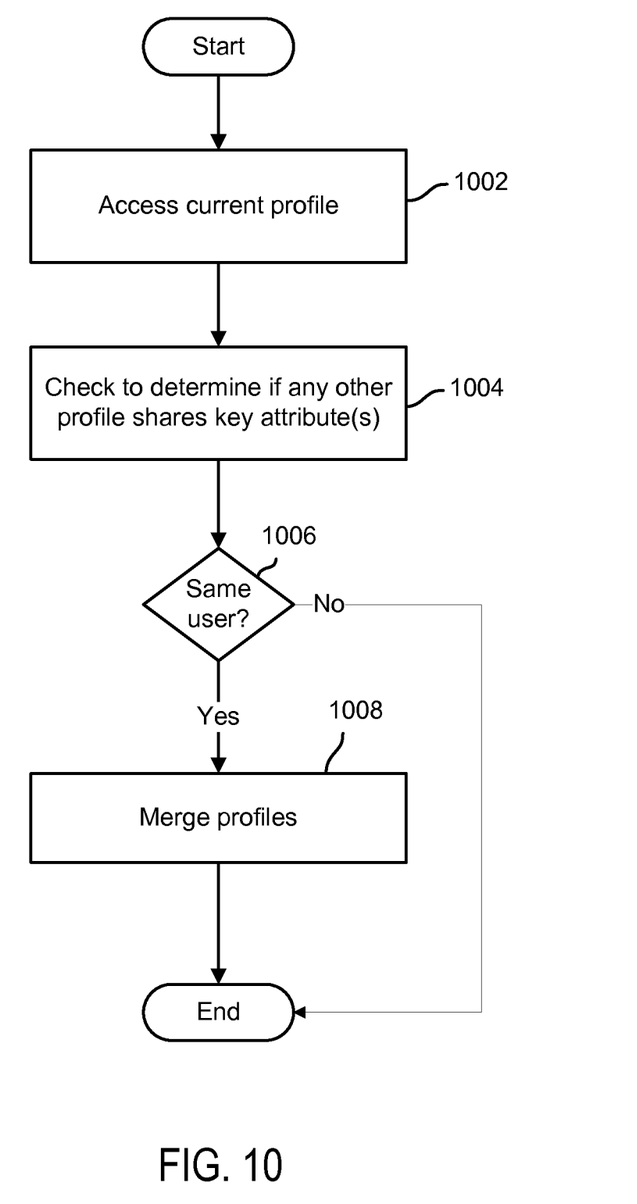
FIG. 10 is a flow chart illustrating an embodiment of a process to manage user profile data.

FIG. 10 is a flow chart illustrating an embodiment of a process to manage user profile data. In various embodiments, at least initially a unique user may have more than one profile. For example, a user for whom a profile has been built based on the user's use of a first device may acquire and begin using a second device, for example a new phone or other mobile computing device. Initially, the second device will be recognized to be a device that was not previously known. A "new" user profile may be created for an initially anonymous user associated with the second device. Over time however, the fact that the "user" with which the second device is associated is the same user for whom a profile was created based on the user's use of the first device. In the example shown in FIG. 10, a current profile is accessed (1002), for example in connection with an ad request, or by a process that runs in the background to detect and merge duplicate profiles. A check is performed to determine whether the accessed profile shares any key attribute(s) with any other profile (1004). For example, if the accessed profile has a same home street address as another profile, further processing may be performed to determine whether the profiles are associated with a same user (1006). In some embodiments, the further processing may include checking to determine if other attributes and/or location patterns in the respective profiles are the same or sufficiently similar to conclude that the profiles are associated with a single, same user. If the profiles are determined to be for the same user (1006), the profiles are merged (1008) and the duplicate profile is eliminated. For example, in the example described above, the user profile associated with the first device may be updated to reflect that the same user is also associated with the second device, and any user attribute data stored in the profile created for the second device, such as user attributes derived from locations at which the second device was used, may be used to update the profile associated originally with the first device.

In various embodiments, IP coincidence-based techniques may be used to determine whether two or more devices are associated with a single "user", and based on such a determination to merge user profiles and/or split a profile into two or more distinct user profiles. Most paid internet subscriptions have a unique IP address. For example, the IP address that powers the WiFi in a user's house is different and unique from the IP address of that user's neighbor, even though both may use the same Internet service provider. For every ad that is served to a user who is connected to the Internet via the WiFi at the user's house, the same IP address is sent in the ad request, regardless of device. So, for example, if the user is using an app on a first device at home over WiFi and later on (could be another day or another week) the user uses an app on a second device at home over WiFi, the two devices would be associated with the same unique IP address. In various embodiments, an IP address to home or other street address mapping is built. The IP address to street address mapping may be used to more correctly assign two devices to one user. For example, in some embodiments, if the street address has been determined to be the user's home address (as opposed to anyplace that has "shared" WiFi, such as work or a public place like a coffee shop or other hotspot), a decision to merge two initially separate profiles, each associated with a separate device identifier but with the same IP address, may be made with higher confidence.

In various embodiments, user profile information derived primarily based on ad requests and associated location information received in connection with a user's use of a first set of one or more devices (e.g., a smartphone) may be used to inform interaction with the same user, via user attribute information stored in the user's profile, during time in which the user is using a typically more stationary and/or location-history rich but at least sometimes mobile or at least portable device, such as a laptop, tablet, or other portable computer. For example, for a typical user who uses a smartphone, a tablet, and a laptop computer, e.g., in the course of a business trip, the user may be observed (for example, via ad requests) to use the tablet and/or laptop at airports, in hotels, and in multiple cities; however, a rich location history may not be able to be built based on the user's use of a tablet and/or laptop alone, because typically a user will not use such a device to connect at restaurants, auto dealerships, beauty salons, etc. By contrast, the user may be observed at a greater diversity of locations through the user's use of their smartphone. By associating all three devices with the same user profile, using techniques disclosed herein, a location-derived profile that more accurately describes the user based on the user's locations as determined (primarily) from their use of their smartphone may be used to target in a more informed way ads sent to the user when the user is using the user's tablet or laptop. For example, if a user was observed based on an ad request received from their smartphone to have been on a car lot this past Sunday, an auto advertisement may be served to the user on the user's tablet while the user is connected to WiFi at home, even though the user never took their tablet to the car lot.

In some embodiments, an ad or other content may be provided in a manner that includes, reflects, and/or is otherwise informed by a user address data stored in the user's profile. For example, in the example described above, the ad for the car lot may be served to the user via the user's tablet while the user is at home in a manner that reflects the system's awareness—based on the user's profile; information included in the ad request, such as the IP address associated with the user's home WiFi; and/or contextual information such as the day of the week, time of day, etc.—that the user is at home or some other user location the street address of which is known. For example, directions from the known user location to a retail store with which an ad is associated may be included and/or a link to such information may be included in the ad.

In various embodiments, a user profile that is based at least in part on a user's location history may be used to select advertising and/or other content to be provided to the user.

While in certain examples described herein a user profile generated at least in part based on a user's past location(s) is used to determine an ad to be served to the user, in various embodiments a profile so generated may be used for one or more other or different purposes, including without limitation to select non-advertising content to be provided to the user. In addition, while in various embodiment a user profile is built to associate with a user one or more attributes derived from that user's past location(s), in other embodiments, advertising and/or other content may be selected for a user based on the user's past location(s) other than by storing in a user profile one or more user attributes derived from such past location(s). For example, in some embodiments, a user's past location(s) may be evaluated dynamically, at content selection time, to select content based at least in part on such past location(s).

Techniques disclosed herein enable the intersection of users and their locations to be used to assign users to audience segments, enabling content more likely to be of interest to a particular user, such as mobile ads, to be provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
 storing, in a computing apparatus, a first set of location data, the first set of location data identifying:
  a plurality of predetermined first locations, and
  a set of attributes of past users who have visited the plurality of predetermined first locations and thus associated with the plurality of predetermined first locations in the computing apparatus;

receiving, in the computing apparatus, user location data, the user location data identifying a plurality of second locations at which a mobile device of a user is observed;

mapping, by the computing apparatus, the plurality of second locations of the mobile device to corresponding locations in the plurality of predetermined first locations, wherein each of the plurality of second locations of the mobile device is mapped to a corresponding location in the plurality of predetermined first locations in the first set of location data;

identifying, by the computing apparatus based on the mapping and the first set of location data stored in the computing apparatus, first attributes of past users who have visited the corresponding locations in the plurality of predetermined first locations, where the first attributes are, in the first set of location data, associated with the corresponding locations to which the plurality of second locations of the mobile device are mapped;

updating, by the computing apparatus, a profile of the user by adjusting the profile of the user, using a weighted algorithm, based on the first attributes that are identified, via the mapping, from the first set of location data, wherein in response to further user location data of the mobile device being mapped into further predetermined locations in the plurality of predetermined first locations that are identified in the first set of location data, the updating of the profile is repeated for the further predetermined locations, based on the weighted algorithm and further attributes associated in the first set of location data with the further predetermined locations, to incrementally improve accuracy of the profile; and determining, by the computing apparatus, confidence levels of attributes in the user profile including the first attributes identified via the mapping.

2. The method of claim 1, wherein a first attribute is associated with a pattern of being at a subset of the plurality of predetermined first locations; and the method further comprises:

determining whether the plurality of second locations of the mobile device as being mapped to the corresponding locations in the plurality of predetermined first locations include the pattern;

wherein the updating includes:
in response to a determination that the plurality of second locations of the mobile device as being mapped to the corresponding locations in the plurality of predetermined first locations include the pattern, updating the user profile to include the first attribute.

3. The method of claim 2, wherein the pattern is based at least in part on times of visiting locations in the subset of the plurality of predetermined first locations.

4. The method of claim 1, wherein each location of the plurality of predetermined first locations corresponds to a predefined geographic area.

5. The method of claim 1, wherein the updating includes updating a confidence level of a first attribute in the profile of the user based on a detection of a location in the plurality of second locations of the mobile device being within a location in the plurality of predetermined first locations that is related to the first attribute.

6. The method of claim 1, further comprising:
receiving a request from a second user having a profile, the request identifying a current location of the second user; and
updating the first set of location data based on the profile of the second user.

7. The method of claim 6, further comprising:
determining a corresponding location in the plurality of predetermined first locations in the first set of location data;
wherein the updating the first set of location data includes updating attributes associated with the corresponding location in the plurality of predetermined first locations based on the profile of the second user.

8. A non-transitory computer storage medium storing instructions configured to instruct a computing apparatus to perform a method, the method comprising:

storing, in the computing apparatus, a first set of location data, the first set of location data identifying:
a plurality of predetermined first locations, and
a set of attributes of past users who have visited the plurality of predetermined first locations and thus associated with the plurality of predetermined first locations in the computing apparatus;

receiving, in the computing apparatus, user location data, the user location data identifying a plurality of second locations at which a mobile device of a user is observed;

mapping, by the computing apparatus, the plurality of second locations of the mobile device to corresponding locations in the plurality of predetermined first locations, wherein each of the plurality of second locations of the mobile device is mapped to a corresponding location in the plurality of predetermined first locations in the first set of location data;

identifying, by the computing apparatus based on the mapping and the first set of location data stored in the computing apparatus, first attributes of past users who have visited the corresponding locations in the plurality of predetermined first locations, where the first attributes are, in the first set of location data, associated with the corresponding locations to which the plurality of second locations of the mobile device are mapped;

updating, by the computing apparatus, a profile of the user by adjusting the profile of the user, using a weighted algorithm, based on the first attributes that are identified, via the mapping, from the first set of location data wherein in response to further user location data of the mobile device being mapped into further predetermined locations in the plurality of predetermined first locations that are identified in the first set of location data, the updating of the profile is repeated for the further predetermined locations, based on the weighted algorithm and further attributes associated in the first set of location data with the further predetermined locations, to incrementally improve accuracy of the profile; and determining, by the computing apparatus, confidence levels of attributes in the user profile including the first attributes identified via the mapping.

9. The medium of claim 8, wherein a first attribute is associated with a pattern of being at a subset of the plurality of predetermined first locations; and the method further comprises:

determining whether the plurality of second locations of the mobile device as being mapped to the corresponding locations in the plurality of predetermined first locations include the pattern;

wherein the updating includes:

in response to a determination that the plurality of second locations of the mobile device as being mapped to the corresponding locations in the plurality of predetermined first locations include the pattern, updating the user profile to include the first attribute.

10. The medium of claim 9, wherein the pattern is based at least in part on times of visiting locations in the subset of the plurality of predetermined first locations.

11. The medium of claim 8, wherein each location of the plurality of predetermined first locations corresponds to a predefined geographic area.

12. The medium of claim 8, wherein the updating includes updating a confidence level of a first attribute in the profile of the user based on a detection of a location in the plurality of second locations of the mobile device being within a location in the plurality of predetermined first locations that is related to the first attribute.

13. The medium of claim 8, wherein the method further comprises:

receiving a request from a second user having a profile, the request identifying a current location of the second user; and updating the first set of location data based on the profile of the second user.

14. The medium of claim 13, wherein the method further comprises:

determining a corresponding location in the plurality of predetermined first locations in the first set of location data;

wherein the updating the first set of location data includes updating attributes associated with the corresponding location in the plurality of predetermined first locations based on the profile of the second user.

15. A computing apparatus, comprising:

at least one processor;

a memory storing instructions configured to instruct the at least one processor to:

store, in the computing apparatus, a first set of location data, the first set of location data identifying:

a plurality of predetermined first locations, and a set of attributes of past users who have visited the plurality of predetermined first locations and thus associated with the plurality of predetermined first locations in the computing apparatus;

receive, in the computing apparatus, user location data, the user location data identifying a plurality of second locations at which a mobile device of a user is observed;

map, by the computing apparatus, the plurality of second locations of the mobile device to corresponding locations in the plurality of predetermined first locations, wherein each of the plurality of second locations of the mobile device is mapped to a corresponding location in the plurality of predetermined first locations in the first set of location data;

identify, by the computing apparatus based on the mapping and the first set of location data stored in the computing apparatus, first attributes of past users who have visited the corresponding locations in the plurality of predetermined first locations, where the first attributes are, in the first set of location data, associated with the corresponding locations to which the plurality of second locations of the mobile device are mapped;

update, by the computing apparatus, a profile of the user by adjusting the profile of the user, using a weighted algorithm, based on the first attributes that are identified, via the mapping, from the first set of location data, wherein in response to further user location data of the mobile device being mapped into further predetermined locations in the plurality of predetermined first locations that are identified in the first set of location data, updating of the profile is repeated for the further predetermined locations, based on the weighted algorithm and further attributes associated in the first set of location data with the further predetermined locations, to incrementally improve accuracy of the profile; and determine, by the computing apparatus, confidence levels of attributes in the user profile including the first attributes identified via the mapping.

16. The computing apparatus of claim 15, wherein:

a first attribute is associated with a pattern of being at a subset of the plurality of predetermined first locations;

the instructions are further configured to instruct the at least one processor to determine whether the plurality of second locations of the mobile device as being mapped to the corresponding locations in the plurality of predetermined first locations include the pattern; and the profile of the user is updated to include the first attribute in response to a determination that the plurality of second locations of the mobile device as being mapped to the corresponding locations in the plurality of predetermined first locations include the pattern.

17. The computing apparatus of claim 16, wherein the pattern is based at least in part on times of visiting locations in the subset of the plurality of predetermined first locations.

18. The computing apparatus of claim 15, wherein the profile of the user is updated via updating a confidence level of a first attribute in the profile of the user based on a detection of a location in the plurality of second locations of the mobile device being within a location in the plurality of predetermined first locations that is related to the first attribute.

19. The computing apparatus of claim 15, wherein the instructions are further configured to instruct the at least one processor:

receive a request from a second user having a profile, the request identifying a current location of the second user; and update the first set of location data based on the profile of the second user.

20. The computing apparatus of claim 19, wherein the instructions are further configured to instruct the at least one processor:

determine a corresponding location in the plurality of predetermined first locations in the first set of location data; and update attributes associated with the corresponding location in the plurality of predetermined first locations based on the profile of the second user to update the first set of location data.

* * * * *